June 27, 1961 W. C. NISE 2,990,456

MINIATURE EXTENSION TELEPHONE

Filed April 11, 1960

INVENTOR.
Wilfred C. Nise

BY C. A. Gulbrandsen

Atty.

2,990,456

MINIATURE EXTENSION TELEPHONE

Wilfred C. Nise, Des Plaines, Ill., assignor to Automatic Electric Laboratories, Inc., Northlake, Ill., a corporation of Delaware Filed Apr. 11, 1960, Ser. No. 21,454
8 Claims. (Cl. 179—147)

The present invention pertains to telephone substation equipment, particularly to a small size two piece instrument without ringer for use as an extension telephone. A conventional telephone of the "desk stand" type comprises a casing or housing including a plurality of tines formed thereon to make a cradle for positioning the handset. The handset includes a handle with a receiving element and a transmitting element positioned at either end thereof in a housing formed to conform to the average relative position of a person's ear and the mouth. The handle is adapted to be positioned in the cradle formed by the tines of the housing with the receiver and transmitter housings extending substantially beyond the base housing. The hookswitch of the desk stand is normally operated by the axial movement of a pair of cylindrical plungers positioned in the cradle for operation by the mass of the handset responsive to placing the handset in the cradle.

The small size telephone of this invention, hereinafter referred to as the phonette, does not utilize tines to position the handset, but has two contoured positioning or retaining wells formed in a housing on either side of a dialling unit to fit the contours of the receiving and transmitting housings of the handset. The hookswitch is operated by the pivoted action of either of a pair of hookswitch bars one located in a slot in the floor of each of the positioning wells.

It is a primary object of this invention to provide a telephone base with retaining wells conforming to the contour of the receiving and transmitting elements of a handset for positive positioning thereof.

Another object of this invention is to provide a telephone base with pivoted hookswitch bars diametrically positioned in the positioning wells for operation of the hookswitch mechanism responsive to pressure at any point therealong.

Still another object of this invention is to provide a telephone base with a hookswitch mechanism including a pivoted hookswitch bar positioned in the floor of a positioning well adapted to move a hookswitch buffer a uniform distance responsive to the movement of any point of the upper surface of the bar into the plane of the floor of the positioning well.

Another object of this invention is to provide an inclined surface on the hookswitch operating mechanism for cooperation with the surfaces of the receiver and transmitter housing of the handset to cause the handset to automatically seat itself when it is improperly replaced at or near the front of the positioning means.

These and other objects of the present invention will be apparent to one skilled in the art from the following detailed description when taken in conjunction with the drawings wherein.

Figures 1, 2, 3:
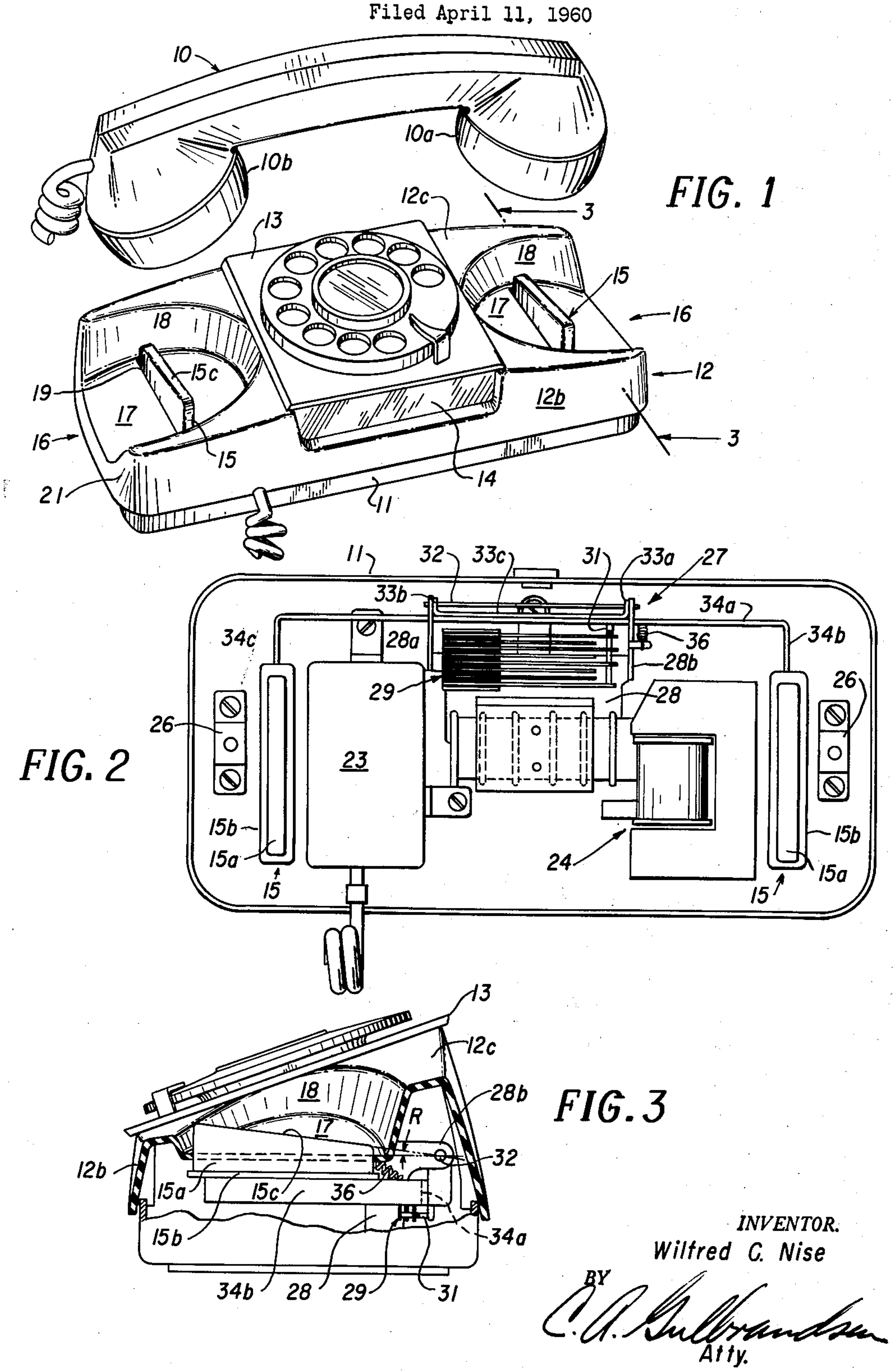
FIG. 1 is a perspective view of the phonette and standard handset of this invention.
FIG. 2 is a plan view of the phonette with the housing removed.
FIG. 3 is a sectional view taken along the lines 3—3 of FIG. 1 looking in the direction of the arrows.

Referring now to the drawings, the phonette base comprises a substantially rectangular base tray 11 to which the usual transmission assembly and terminal blocks are attached, and a housing 12 which encloses these elements, in cooperation with a dial modular panel 13 and a decorative or night light panel 14. The housing 12 is formed with the rear enclosure wall **12*a* being substantially wider than the front enclosure wall 12*b*** so that the top surface of the housing and the dial modular panel are formed at an angle to the horizontal.

The housing 12 includes two symmetrically positioned retaining wells 16, one formed in the top housing surface on either side of the dial panel. Each of the positioning wells is defined by a planar floor 17 formed at an angle of substantially eight degrees to the horizontal, and a substantially U-shaped arcuate wall 18. The floors 17 of the retaining wells are formed to approximately conform to the pitch of the face of the receiver and transmitter housings **10*a* and 10*b* of a handset 10 so that the housing faces and floor surfaces will be in contact over a substantial area when the handset is positioned on the base. A linear slot 19 is formed through the floor 17** of each of the retaining wells and runs substantially the width thereof along a predetermined horizontal line as will be explained in detail below.

The arcuate sidewalls 18 of the wells are formed with a progressive vertical taper from vertical at the midpoint adjacent the dial panel 13, to eight degrees from vertical at the open ends thereof adjacent the end panels 21 of the housing 12. Because of the inclination of the top surface **12*c*, the sidewalls 18 of the wells 16 are also formed with a progressive horizontal taper with a high portion of the wall being rearwardly of the base and regularly tapered to a low portion at the front of the base. The handset 10 is guided by the vertical taper of the sidewalls to a position with the faces of the receiver and transmitter housings resting on the floor of each positioning well. A hookswitch operating bar 15 is, in its normal position, formed with a top linear surface inclined with its high portion toward the front of the base and a low portion toward the rear of the base so that placing the handset at or near the front portion of the positioning wells 16 will cause the handset to be guided into the positioning wells and against the high portion of the arcuate wall 18**.

Referring now to FIGS. 2 and 3, the base tray 11 supports two conventional transmission elements 23 and 24 riveted thereto, a pair of housing mounting brackets 26 adapted to receive a holding screw for securing the housing 12 to the base section 11, and a hookswitch assembly indicated generally at 27.

The hookswitch assembly comprises a bifurcated mounting bracket 28 riveted to the floor of the base tray, a hookswitch spring pileup 29 secured to one leg **28*a* of the mounting bracket 28 with its contact points extending therefrom to a position aligned with a hookswitch buffer 31 supported on a pivot means for opening or closing a contact in accordance with the movement thereof. The pivot means includes a shaft 32 rotatably supported at either end by a leg of the mounting bracket 28, a yoke 33 having two legs 33*a* and 33*b* secured to the shaft 32 and extending downwardly therefrom to support a cross piece 33*c* and the buffer 31 which is secured to the cross piece. Due to the relatively short distance of travel and the relatively long radius of the buffer from the pivot point, the locus of the buffer responsive to rotation of the yoke 33** is substantially lineal as it moves from a non-operated position permitting the hookswitch contacts to close to an operated position opening the hookswitch contacts.

The yoke 33 has an extension 34 suitably secured thereto by means of a cross piece **34*a* which has two right angle extensions forming lever arms 34*b* and 34*c*. The yoke 33 is urged in a clockwise direction (FIG. 3) by a spring 36 fixed at one end to the stationary leg 28*b* of the mounting bracket 28 and at the other end to the bottom of the cross piece 34*a*. Rotation of the yoke in a clockwise direction is limited by a stop on the mounting bracket 28**.

The vertical positioning of the pivot shaft 32 is such that a horizontal plane including the axis of rotation thereof intersects the inclined plane including the floor 17 of the retaining well along a line through the approximate midpoints of each retaining well when the housing 12 is properly positioned on the base tray 11. The slots 19 are formed along this line of intersection and therefore, lie along an extended radius of rotation of the axis of rotation of the pivot shaft 32.

The lever arms **34*b* and 34*c* each support a trapezoidal hookswitch bar 15 along its lower edge. The upper edge 15*c* is formed at a predetermined angle along an extended radius of the axis of rotation of the shaft 32 so that an extension thereof intersects the axis of rotation of the pivot shaft 32. The hookswitch bars 15 are formed with a narrow portion 15*a* adapted to pass through the slots 19 in the retaining well floor 17 and to be vertically movable therein when the housing 12 is properly positioned on the base tray 11 of the phonette. A ridge 15*b* formed on the hookswitch bar 15 is positioned within the enclosure formed by the cooperation of the housing 12 and the base tray 11** to limit the upward movement of the bar.

Because the top edge of the bar 15 lies along an extended radius of the axis of rotation of the pivot shaft 32, movement of any point on the edge **15*c* into the plane of the floor 17 along the slot 19 rotates the shaft 32 through a predetermined angle. The predetermined angle of rotation R is defined by the projected intersection of extensions of the edge 15*c* and the slot 19. Movement of the buffer 31 resulting from rotation of the hookswitch pivot assembly responsive to pressure applied to any point on the edge 15*c* of the bar 15 is always the same, due to the uniform rotation of the pivot shaft 32**. In the past, uniform travel of a hookswitch buffer could be attained only through a lever and cam arrangement.

The hookswitch bar in the retaining well is much more satisfactory than a vertical plunger for the elimination of accidental "off hook" conditions which are prone to happen because of the careless replacement of the handset after use. The constant pivot bar 15 is operated responsive to even an edge of the transmitter or receiver housing of the handset being placed in the retaining well and the buffer movement is constant and, due to its pivoted movement, is not subject to binding resulting from lateral forces applied thereto, regardless of where the pressure is applied. Further, the bar tends to guide the handset into proper position due to its inclined surface.

When the handset is placed on the phonette base, the receiver and transmitter housings are placed in the retaining wells as is pointed out above. The weight of the handset causes each constant pivot bar 15 to be rotated in a counter-clockwise (FIG. 3) direction into the plane of the floor 17 thereby rotating the pivot assembly with the pivot shaft and moving the buffer 31 away from the contacts of the spring pileup allowing those contacts to open and open the transmission circuit of the instrument. Removal of the handset from the phonette base permits the hookswitch assembly to be rotated in a clockwise direction (FIG. 3) by the spring 36 thereby moving the buffer 31 toward the spring pileup to close the spring contacts to close the transmission circuit of the telephone instrument to its home position and return the hookswitch mechanism.

While the present invention has been described in a particular embodiment it should be understood that various modifications and changes may be made therein without departing from the spirit and scope of the invention as defined in the appended claims.

What I claim is:

1. In a telephone desk stand having a base and a handset, a hookswitch mechanism comprising: rotatably mounted pivot means; lever means secured to said pivot means and extending perpendicular to the axis of rotation thereof; normally closed contact means; means responsive to rotation of said pivot means through a predetermined angle for opening said contact means; handset positioning means including a positioning edge lying along a first predetermined radius of rotation of said pivot means; and a hookswitch bar secured to said lever means and movable past said positioning edge, said bar including a lineal surface normally lying along a second predetermined radius of rotation of said pivot means and adapted to be rotated to a position parallel with said positioning edge by the placing of said handset on said base whereby said pivot means is rotated through a predetermined angle by the positioning of said handset on said base.

2. In a telephone desk stand including a base and a handset, a hookswitch mechanism comprising: rotatably mounted pivot means; lever means secured to said pivot means; normally closed contact means for completing a transmission from said handset to a telephone line; means responsive to rotation of said pivot means through a predetermined angle of rotation for opening said contact means; handset positioning means including two inclined planes formed on said base, each plane having an elongated slot therein formed along an imaginary line of intersection of said plane with a projected horizontal plane containing the axis of rotation of said pivot means; two hookswitch bars secured to said lever means each with an upper portion projected through the slot of one of said inclined planes, the upper portion of said bar terminating in a lineal surface lying along a line perpendicular to the axis of rotation of said pivot means; and resilient means for normally holding said lever means in an unoperated position with said lineal surface of said hookswitch bar at a predetermined angle to said slot whereby placing any part of said handset in contact with said inclined plane along said slot rotates said pivot means through a predetermined angle of rotation to open said contact means.

3. A telephone desk stand connected to a telephone line comprising: a handset including a receiver and transmitter housing integrally formed at either end of a handle portion with the faces thereof lying in different planes at an acute angle to the horizontal; a base section including transmission elements and hookswitch means adapted to be rotated through a predetermined angle about an axis of rotation to disconnect the transmission elements of said telephone from the telephone line, and a housing enclosing said transmission elements and said hookswitch means; and means for positioning said handset on said base when said telephone is not in use, said positioning means including two retaining wells formed in said housing each defined by an arcuate side wall and an inclined plane at an acute angle with the horizontal and having a slot therein lying substantially along a radius of rotation of said hookswitch mechanism, and two hookswitch bars one extending through the slot of each of said inclined planes and secured to said hookswitch mechanism below said inclined plane with one lineal surface normally positioned above said plane along a radius of rotation of said hookswitch mechanism, whereby said hookswitch mechanism is rotated through a predetermined angle each time that said handset is positioned on said base to disconnect said transmission circuit from said telephone line.

4. In a telephone instrument: a handset including a receiver and transmitter housing; a base tray; hookswitch means positioned on said base tray operable to open a transmission circuit in said instrument; a housing secured to said base tray to form an enclosure in cooperation therewith; two retaining wells formed in the outer surface of said housing each adapted to receive the receiver or transmitter housing of said handset and including a planar floor having an elongated slot therethrough, and an arcuate side wall regularly tapered from a high portion adjacent one end of said arc to a lower portion at the opposite end of said arc; two lever arms one pivotally positioned below the floor of each retaining wall, said lever arms each adapted to be rotated from a home position; and two elongated hookswitch bars one positioned in the slot of each retaining well with a bottom portion secured to the associated lever arm and having a top lineal surface above said floor and inclined thereto when said lever arm is in its home position whereby the projected intersection of said lineal surface and said floor forms an arcuate angle, with the apex being toward the high portion of said side wall.

5. In a telephone instrument: a handset including a receiver and transmitter housing; a base tray; hookswitch means on said base tray operable to open a transmission circuit of said instrument; means mounted on said base tray including a horizontal pivot shaft adapted to be rotated through a predetermined angle of rotation to operate said hookswitch means; a housing secured to said base tray to form an enclosure in cooperation therewith; two retaining wells formed in said housing each adapted to position the transmitter or receiver housing of said handset, said retaining wells being defined by an arcuate side wall regularly tapered from a high portion adjacent one end of said arc to a low portion adjacent the opposite end of said arc and a planar floor having an elongated slot therein running substantially between the high portion and low portion of said side walls; two lever arms within said enclosure attached to said pivot shaft, each having a portion thereof positioned below the slot of one of said retaining wells, and each adapted to be rotated from a home position through a predetermined arc about said pivot shaft; and two elongated hookswitch bars one positioned in the slot of each retaining well with a bottom portion secured to its associated lever arm and a top lineal surface above said floor and inclined thereto when said lever arm is in its home position, whereby the projected intersection of said lineal surface and said floor forms an acute angle with the apex toward the high portion of said side wall.

6. In a telephone instrument: a handset including a receiver and transmitter housing; a base tray; a housing secured to said base tray to form an enclosure in cooperation therewith; contact means positioned within said enclosure normally closed to complete a transmission circuit for said telephone instrument; a horizontal pivot shaft rotatably positioned within said enclosure a predetermined distance above said base tray; buffer means operated by rotation of said pivot shaft through a predetermined angle of rotation to open said contact means; two lever arms secured to said pivot shaft for rotation thereof responsive to the movement of either of said lever arms; two retaining wells formed in said housing for positioning said handset therein, each of said retaining wells including a planar floor lying in one of two converging planes at a predetermined angle to a horizontal plane including the axis of rotation of said pivot shaft, and having an elongated passageway from the outer surface of said housing to said enclosure lying substantially along the line of intersection with said horizontal plane, and a substantially U-shaped arcuate side wall, the open ends of the side walls being oppositely positioned toward the outer extremity of said housing along the lower portion of said floor; and two elongated hookswitch bars one positioned in the slot of each retaining well secured within said enclosure to one of said lever arms and having a top lineal surface above said floor and inclined thereto along a predetermined radius of rotation of said pivot shaft, whereby movement of any point of said top lineal surface into the plane of said floor rotates its associated lever arm through a predetermined angle of rotation of said pivot shaft to impart a predetermined amount of rotation thereto.

7. In a telephone instrument: a handset including a receiver housing and a transmitter housing; a base tray; a housing secured to said base tray to form an enclosure in cooperation therewith; hookswitch means mounted on said base tray within said enclosure operable to open a transmission circuit of said instrument; support means secured to said base tray within said enclosure; a horizontal pivot shaft rotatably mounted on sad support means a predetermined distance above said base tray; two inclined planes formed on the outer surface of said housing each lying in one of two converging planes and having a slot formed therein all points of one edge of which lie in a horizontal line located said predetermined distance above said base tray; two lever arms within said enclosure attached to said pivot shaft each having at least a portion thereof positioned below one of said slots and each adapted to be rotated from a home position; and two elongated hookswitch bars one positioned in each of said slots with a bottom portion secured to one of said lever arms and a top lineal surface above said plane and inclined thereto when said lever arm is in its home position said surface lying along a radius of rotation of said pivot shaft.

8. In a telephone instrument; a handset including a receiver and transmitter housing; a base tray; housing mounting brackets secured to said base tray; a housing secured to said mounting brackets to form an enclosure in cooperation with said base tray, said housing including a front panel of first predetermined height, a rear panel of a second predetermined height which is greater than said first predetermined height, dial means positioned on an inclined plane between said front panel and said rear panel, an inclined top panel between said front panel and said rear panel, and two U-shaped retaining wells formed with open ends opposed on either side of the dial means in said top panel for receiving the receiver and transmitter housing of said handset; two hookswitch bars secured within said enclosure to said operating means and one extending through a passageway in each of said retaining wells to have a portion thereof normally positioned within said retaining well outside of said enclosure, said hookswitch bars being formed with an inclined surface for guiding said receiver and transmitter housing into said retaining wells.

No references cited.